United States Patent [19]
Harris

[11] 4,353,399
[45] Oct. 12, 1982

[54] MULTIPURPOSE TOOL

[75] Inventor: Richard L. Harris, 301 First St. East, Stewartville, Minn. 55976

[73] Assignees: Richard L. Harris, Stewartville; Ralph W. Blader, Richfield, both of Minn.

[21] Appl. No.: 117,633

[22] Filed: Feb. 1, 1980

[51] Int. Cl.³ ............................................. B27B 17/00
[52] U.S. Cl. ..................................... 144/2 R; 83/574; 83/733; 83/802; 83/565; 144/134 R; 144/144R; 269/69; 269/71; 269/54.1; 269/905
[58] Field of Search ................. 269/69, 71, 905, 54.2; 83/574, 794, 733, 411 R, 745, 802, 565; 144/1 R, 3 R, 134 R, 136 R, 134 D, 144 R, 136 C, 2 R

[56] References Cited
U.S. PATENT DOCUMENTS
3,695,316 10/1972 Pluckhahn ............................ 83/802

Primary Examiner—W. D. Bray
Attorney, Agent, or Firm—Merchant, Gould, Smith, Edell, Welter & Schmidt

[57] ABSTRACT

A semi-portable tool for use with portable saws, routers and other power tools including a stand for holding the piece to be worked and a separate power equipment holder on a separate stand attached to the first stand. A carriage on the holder for the power equipment provides for different positioning of and for movement of the power equipment so that a number of different operations can be performed.

8 Claims, 8 Drawing Figures

MULTIPURPOSE TOOL

BACKGROUND AND SUMMARY OF THE INVENTION

This invention pertains to tools and specifically to a tool adapted to hold alternate portable power tools and thus to provide for those tools to perform functions not ordinarily performed by such portable tools.

There have been multipurpose tools previously proposed and used. Most of these provide a stand which can be placed both vertically and horizontally and include a motor. The motor then drives any of a number of alternate tools which are used to either saw, rout, drill or turn the wood as in a lathe.

There are also various types of stands which can be used to hold a powered portable rotary saw so that it can be used as a table saw.

However, none of these devices has the versatility of my device. I provide a device which will allow a chain saw to be used to cut boards from a log; will allow a router to be used with a template to repeat a given pattern; will allow a portable, powered rotary saw to be used in a manner similar to a radial arm saw; and may provide for such other functions as can be imagined by the user. Also, my device makes far more precision possible than the use of hand tools. It also provides a convenient stand and holder for large or clumsy work pieces.

FIGURES

Figure 1:
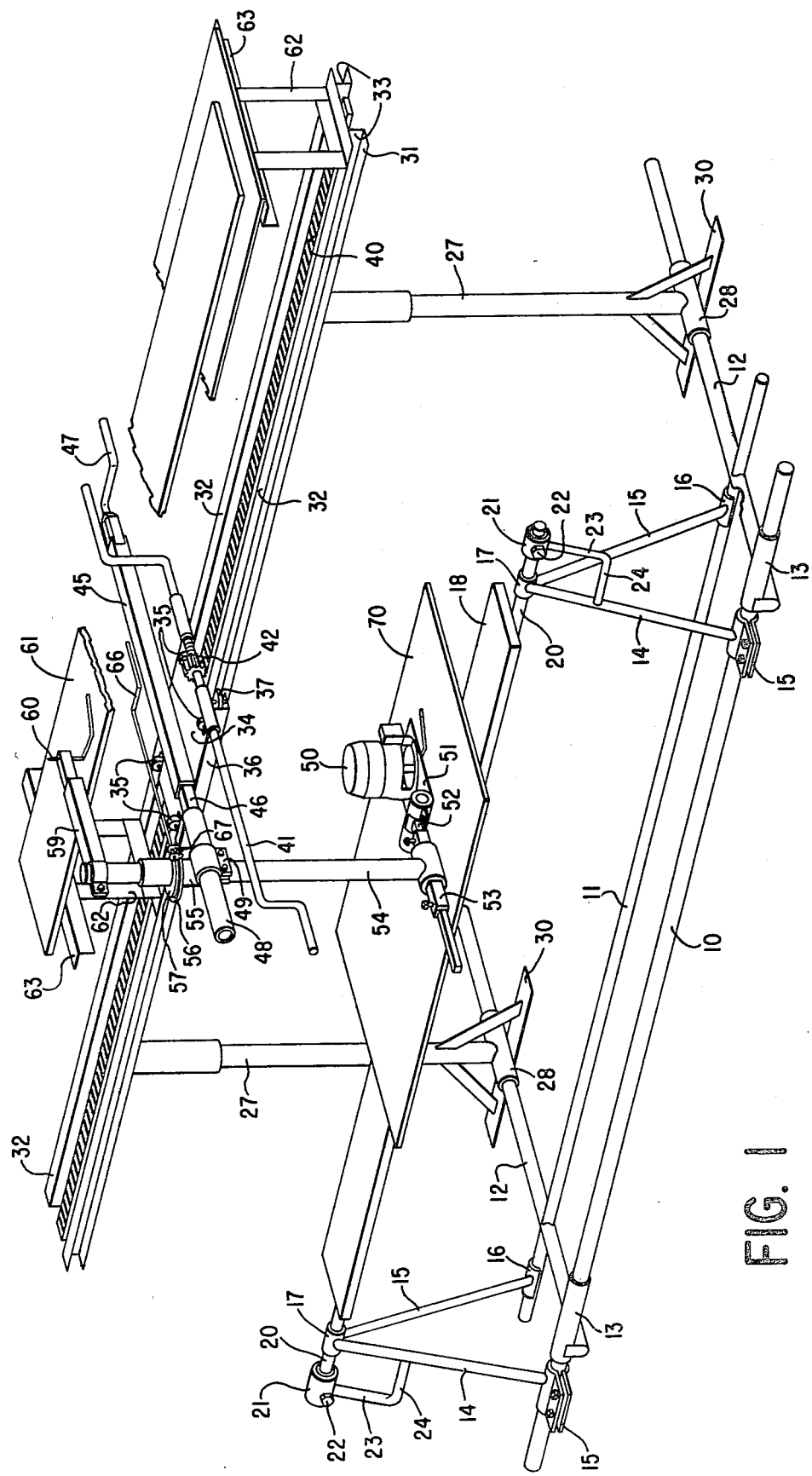
Figure 2:
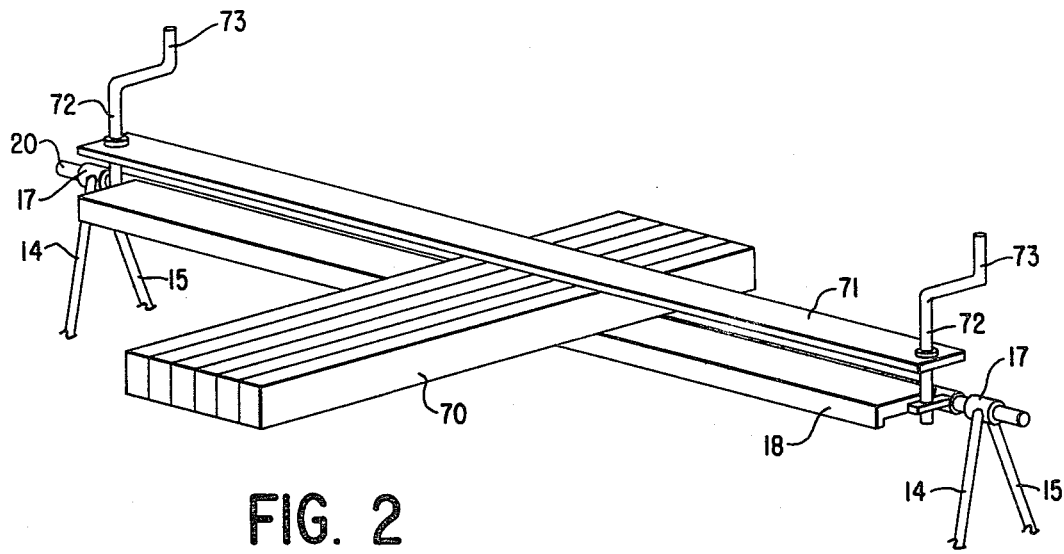
Figure 3:
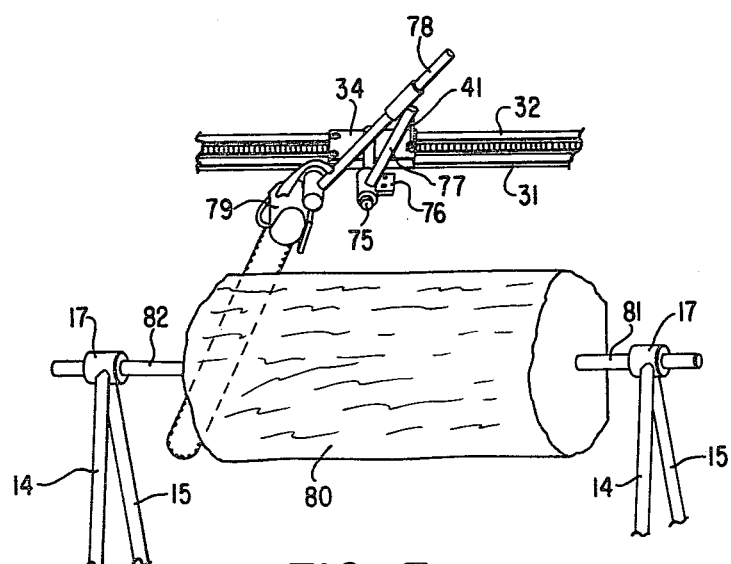
Figure 4:
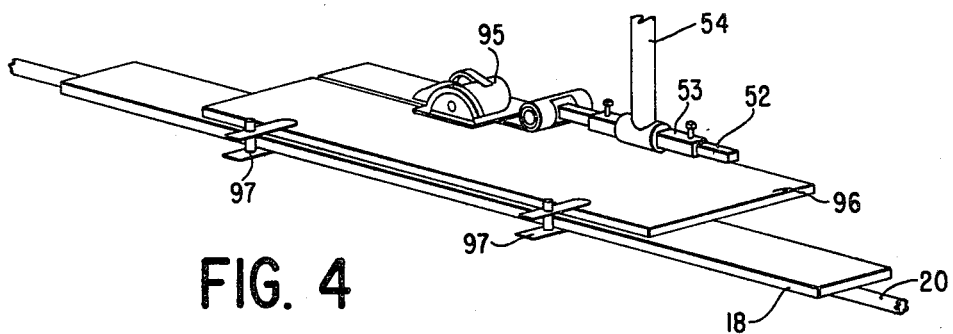
Figure 5:
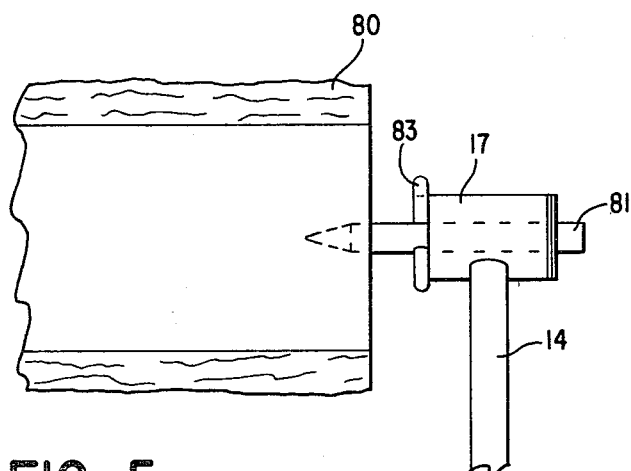
Figure 6:
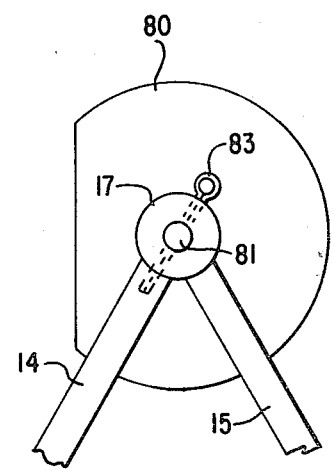
Figure 8:
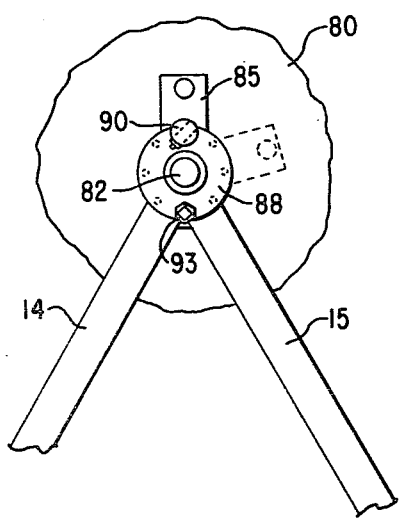
Figure 7:
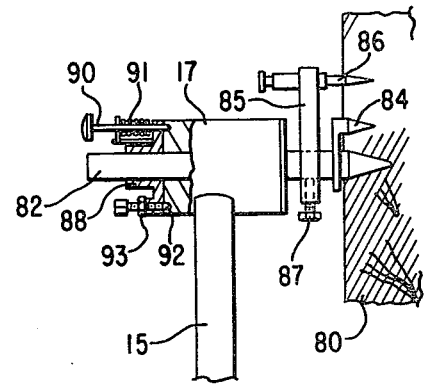

FIG. 1 is a pictorial view of my device set up for use as a pattern-following router, FIG. 2 is a view of the clamping part of my device illustrating a method of holding multiple workpieces, FIG. 3 is a fractional view of my device used with a chain saw as a sawmill, FIG. 4 is a fractional view similar to FIG. 3 showing the parts of my device using a portable powered rotary saw as a ripping saw, FIG. 5 is an elevational view of a part of the clamping mechanism showing one end of a log to be sawed and the holding device for that end, FIG. 6 is an end elevational view of the part of the device shown in FIG. 5, FIG. 7 is a view similar to FIG. 5 of the opposite end of the log and the holding means at that end, and FIG. 8 is a view similar to FIG. 6 of the part of the device shown in FIG. 7.

DESCRIPTION

Briefly my device consists of two stands mounted adjacent each other on a common base. One of the stands holds a piece of material to be worked on. The second stand includes a carriage adapted to carry a power tool movable along a track and sometimes also in other directions relative to that track to cut the material to a desired pattern or line.

More specifically, and referring to the drawings, my device includes a workpiece stand and a tool stand commonly mounted. The workpiece stand includes a pair of longitudinal members 10 and 11 either permanently or releasably fixed to two transverse bars 12. I show in FIG. 1, both methods of fastening, and such fastenings may, to some extent, be used alternatively.

The releasable fastening is illustrated in FIG. 1 applied to the longitudinal members 10. This member is slidably enclosed in tubes or pipes 13 which may be fixed to the transverse bar 12. The member 10 may either be held in position in the tubes 13 or may be left free to turn.

The outer legs 14 of the stand are provided with feet 15 which are also slidable over the member 10. These feet are also adapted to be clamped to the bar either by forming the feet as a split collar which can be clamped in place or by the use of a set screw or the like. Thus, the feet 15 can be clamped to the member 10, but the whole assembly tilted by rotating the member 10 within the sleeve 13 if released.

The permanent fastening is illustrated as used with member 11 which may be welded to the transverse bar 12. The inner leg 15 of the stand then has a post 16 which fits over, but does not embrace the member 11.

My preferred form is the one illustrated in which the outer member 10 can be rotated and where the inner posts 16 will simply lift off the member 11 so that the workpiece holding stand can be laid over on its side. If necessary, while working, the posts 16 may be clamped to the member 11 to prevent unwanted tilting. Any of a number of familiar devices may be used for such clamping including an ordinary C-clamp or a bolted-on device or some attached member surrounding the member 11. Other devices may occur to the user of the device.

At the upper end of the legs 14 and 15, I provide a sleeve 17 fixed to both legs to form the apex of an angle. Various types of work holders may be held in the sleeves 17 as will later appear. In FIG. 1 I illustrate a support for a flat piece. This support includes a flat member or table member 18 to which are fastened axle members 20. These may either be a continuous axle running under the flat member 18 or may be stub axles fastened to the flat member. In either case, the axles are journalled in the sleeves 17 for support. In order to prevent rotation of the holder, I provide clamps at each end including sleeves 21 adapted to be clamped to the axles 20 by means of set screws 22 or the like. Arms 23 are fastened to the sleeves and extend to a tang 24 adapted to extend into a hole formed in one of the legs 14 or 15 of the stand.

The tool holding stand includes a pair of uprights 27 which may preferably be slidably disposed on the transverse bars 12. This may readily be accomplished by providing sleeves 28 fixed to the end of the uprights 27 and embracing the bars. Feet 30 fixed to both the sleeves and the uprights serve to stabilize the uprights in a vertical position. This construction enables the operator to move the work holding stand closer to or further from the tool holding stand.

Atop the uprights I provide a pair of ways 31 which provide support and guiding for the tool holding carriage. These ways may be channel-shaped members running longitudinally of the device and having a relatively smooth upper surface 32 and bottom 33 of the channel.

The carriage includes a plate-like member 34 on which are rotatively mounted four rollers 35 which will ride on the upper surface 32 of the ways. Flanges 36 are provided on the front and rear of the plate 34 to enclose an additional four rollers 37 which roll on the bottom 33 of the way members. Thus, the carriage is restrained and must follow the ways 31 in its movement.

Between the ways 31 and extending longitudinally of the tool holding stand, I provide a rack gear 40. A crank 41 journalled on the plate 34 of the carriage carries a pinion 42 engaged with the rack 40. Thus, rotation of the crank will cause the carriage to be moved along the ways, or holding of the crank in a fixed position will prevent motion along the ways. The description of the hand controlled movement of the carriage should not be taken as precluding a power operation. The same is true of movement of the tool holding mechanism described hereafter. I envision that power driven screw threaded members may be used or that hydraulic or pneumatic cylinder devices could be adapted for such purpose. In fact, it is within my comprehension that such power driven devices might be controlled by computers or that slaved cylinders could be used to make intricate cuts of designs by power saws, routers or the like.

A tool holding mechanism is provided on the carriage. In order to achieve maximum flexibility, I prefer to make this an adjustable mechanism as shown in FIG. 1. Therefore, I provide a larger rectangular (or square) tubing outer member 45 within which is telescoped a slide member 46. By the use of any of a number of familiar screw threaded devices controlled by a crank 47, suitable adjustability of the relative positions of these two members can be provided.

In order to allow easy tilting of the tool itself relative to the tool holding stand, I prefer to have a cylindrical member 48 affixed to the end of the slide 46. By use of a clamping collar 49, I can then provide for an adjustable tilting of the tool.

In the embodiment shown in FIG. 1, the use of a pattern following mechanism to work material is contemplated. The device shown is specifically a router 50, but the use should not be limited to that tool. The router 50 is mounted on a plate 51 which, in turn, is fastened to a bar 52 slidably mounted within a sleeve 53. This sleeve is fixed to an upright 54. The sliding of the bar 52 within the sleeve may be controlled by the use of set screws, clamping mechanism or any other convenient means.

The upright 54 is pivotally journalled in a sleeve 55 to which the clamping collar 49 is fixed. That sleeve 55 also carries at its upper end, a bearing plate 56 on which an upper plate 57 is slidably journalled. That upper plate 57 is adjustably attached to the upper part of the upright so that it is adapted to support the upright, and therefore the tool it carries, in an adjustable vertical position. At its upper end, the upright 54 carries an arm 59 and a pattern follower 60 attached to that arm.

The pattern 61 may be clamped or otherwise releasably fastened to the tool holding stand. I prefer to use a pair of brackets 62 clamped to the ways 31 and having an upper flat member 63 onto which a flat pattern may be laid and clamped, bolted or otherwise held.

Locking means between the plates 56 and 57 may be provided to prevent undesired pivoting of the tool holding upright 54. This means may take any of several forms including the use of a key device 67 controlled by a crank 66 and adapted to be engaged in corresponding slots in the plates 56 and 57. It will be obvious that releasable clamping devices on the two plates could also be used.

It will be apparent from the above description that this device can now be used to copy a pattern onto a workpiece. The workpiece 70 is fastened to the table piece 18 by clamps, screws from the underside or any other convenient means. The pattern is placed on its brackets 62 and the carriage is moved into place. It should be noted that the tool holder and pattern follower are fixed to the upright 54, and that the upright 54 may be slid upward so that the pattern follower 60 and the tool—the router 50 as illustrated—may be lifted clear of the pattern and workpiece respectively, until it is desired to start the routing process when the whole assembly can be lowered. By proper movement of the carriage longitudinally of the device through the operation of the crank 41 and of the slide 46 by operation of the crank 47, the follower 60 can be guided along the pattern, and the router 50 will necessarily follow the pattern, and cut the same pattern in the workpiece. As noted before, I envision that movements of the carriage and tool holder may be caused by power mechanisms. Particularly in connection with the router, slaved cylinders could be used to cause the tool to follow a pattern as described.

In FIG. 2 I illustrate a clamping device adapted to hold a plurality of workpieces such as boards 70 on the table member 18. This is accomplished simply by providing a stiff clamping member 71 lying above the table member, and using screw devices 72 operated by crank 73 at the ends of the clamping member 71. Although I have illustrated a flat member 71, I envision that for some operations it may be desirable to provide a more rigid member and that some sort of truss, or similar device having a vertical web or reinforcement may be used.

I envision that my device may also be used as a sawmill to cut boards or planks from a log. I illustrate such a device using a chain saw in FIG. 3. Although it is reasonable to use the more complex carriage shown in FIG. 1, I can also use a simple carriage having only the plate 34 carried by the rollers on the ways and controlled by the crank 41; and transverse arm 75 which may be adjustable laterally of the ways but is not necessarily so. That lateral adjustment may be accomplished by releasing and adjusting the clamping collar 76 which supports the upright 77. The upright 77 carries a tool holding arm 78 to which the chain saw 79 is fastened. Lateral adjustment is also possible by adjusting the spacing between the stands. This can be done by sliding the transverse member 12 within the sleeves 28 (FIG. 1).

As better illustrated in FIGS. 5 through 8, the workpiece is a log 80 mounted on axle centers 81 and 82, which are, in turn, journalled in the sleeves 17 on the work holding stand. At one end, (FIGS. 5 and 6) the axle 81 may be a simple pointed axle which can be driven into the approximate center of the end of the log 80. A pin 83 extending through the axle member may serve to prevent axial displacement of the axle 81 at this end of the log.

At the other end of the log, (FIGS. 7 and 8) the axle mechanism may be more complex in order to control the workpiece. Here, the axle member 82 may also be a pointed rod. However, in order to keep the log from rotating around its centers, I must provide means to engage the log and hold it rotatively relative to the work holding stand. This I accomplish in either or both of two ways. The center 82 has affixed to it an offset pin 84. In order to allow cutting the center board as small as possible, I prefer that this pin 84 not be offset any more than the radius of the sleeve 17. Thus, the blade of the saw could cut a square piece from the center of the log no larger than the diameter of the sleeve 17.

For more firm holding, and particularly when the cutting is starting, I provide a removable arm 85 carrying a sliding pin 86 at a radius substantially larger that of the sleeve 17. The pin 86 can be driven into the log 80 farther from the center and thereby hold the log better by reason of the greater leverage. The arm 85 can be held in position on the center 82 by a set screw 87, or by a key and keyway or other holding device.

In some instances, it might be desirable to cut at odd angles on the log. Or, it may be desired to turn the log exactly 90° or 180° from the initial cuts. I provide for this by use of an indexing plate 88 which is held on the center 82 against rotation relative thereto. This plate carries either of two means of securing it relative to the sleeve 17. Both are illustrated in FIG. 7, but it is expected that they will be used alternatively.

One device contemplates the use of a pin 90 biased toward the sleeve 17 by a spring 91. Holes are formed around the end of the sleeve at fixed intervals so that the pin may be selectively placed in any of the holes which provide the proper position of the log.

The alternative device is very similar except that in the place of the spring loaded pin, I use a threaded pin 92 which is threadably engaged with the plate 88 and can be run into the holes in the sleeve 17. A jam nut 93 may be used to assure that the pin will be held in place in the hole.

It is also envisioned that while the holes in the sleeve are evenly spaced, such spacing may be broader than desired. For example, it might be possible to provide those holes only every 20° or 30° around the sleeve. In order to provide for smaller spacings, two pin arrangements might be used. With a 20° spacing of the principal holes, the second pin might be spaced 170° from the first. Thus, by using the second pin alternately with the first, a resulting 10° interval might be possible. The other spacings to provide smaller intervals are well within the knowledge of those skilled in the art.

I also envision that the axle mechanism may be rotatively driven by power means so that my device can be used as a lathe. The tool holding and carriage mechanisms could then also be operated to provide patterned decorative cuts on a workpiece.

The usefulness of the pivoting of the work holding legs is most apparent in the use of my device as a sawmill. The log 80 can be rolled up to my device on the floor or ground so that its longitudinal position is approximately correct. The holders consisting of the legs 14 and 15 can then be tilted outward around the log by pivoting the member 10 in the sleeves 13 so that the centers 81 and 82 held in the sleeves 17 are approximately centered on the log 80. Those centers can then be driven into the log, and the assembly again be tilted up so that the feet 16 on the legs 15 again engage the member 11 to support the log in its proper position. It will be readily apparent that it will be easier to position the centers by this operation than it would by hoisting the log between the holders and attempting to drive the centers in place on a suspended log. It will be apparent to those skilled in the art that power means such as a hydraulic cylinder could be used to raise the log holder from the lower position to its upper position.

In FIG. 4 I illustrate my device in use with a portable hand held circular saw 95. The saw is supported by the same tool holding mechanism as the router. Again, the workpiece 96, in this case a flat board, is clamped to the table member 18. Clamps 97 at the edge of the board may be used, but a variety of other means may also occur to the user. In order to rip the board, it is simply necessary to move the carriage longitudinally of the ways, these carrying the saw in a predetermined and fixed path. The angle of the cut is determined by the position of the workpiece 96 on the table so that any desired angle of cut can be made.

I claim:

1. A tool device comprising:
   a base having transverse members and longitudinal members,
   work holding stand means engaged with said base, said work holding stand means including means for holding a workpiece,
   tool holding stand means also attached to said base, said tool holding stand means being adjustably spaced apart from and independent from said work holding stand means,
   tool holding means movably disposed on said tool holding stand means for transverse and longitudinal movement,
   whereby said work holding stand means with said work holding means and said tool holding stand means with said tool holding means may be manipulated independent from each other yet at a location adjacent each other to allow working interaction.

2. The device of claim 1 in which said work holding stand means is tiltably engaged with at least one said longitudinal members so that the work holding stand means can be tilted relative to the common base to pick up said workpiece.

3. The device of claim 2 in which said work holding stand means includes a first pair of legs fastened to a first longitudinal member, said first longitudinal member being rotatably mounted on at least one of said transverse members, a second pair of legs on said work holding stand means being removably engaged with a second longitudinal member, said second longitudinal member being fixed to at least one of said transverse members, said work holding stand means being thereby tiltable by rotation of said first longitudinal member.

4. The device of claim 1 in which said work holding stands means includes leg means attached to said base, said leg means supporting sleeve means, said work holding means including axle means extending into said sleeve means and cooperating therewith for rotatably supporting said work holding means relative to said work holding stand means.

5. The device of claim 4 in which said work holding means is a flat member to which a workpiece can be clamped, said axle means extending from said flat member into said sleeve means and clamping means engaged between said axle means and said leg means to prevent undesired rotation of said flat member.

6. A tool device comprising:
   a base having transverse members and longitudinal members,
   work holding stand means engaged with said base, said work holding stand means including for holding a workpiece,
   tool holding stand means also attached to said base, said tool holding stand means being adjustably spaced apart from and independent from said work holding stand means, said tool holding stand means including longitudinal ways having rack means positioned between said ways,
   tool holding means movably mounted on said ways, said tool holding means including gear means including gear means adapted to mesh with said rack means for longitudinal movement of said tool holding stand means, said tool holding means further including a carriage having a laterally adjustable arm for transverse movement of said tool holding stand means, whereby said work holding stand means with said work holding means and said tool holding stand means with said tool holding means may be manipulated independent from each other yet at a location adjacent each other to allow working interaction.

7. The device of claim 6 in which said adjustable arm is adjusted by a screw threaded mechanism.

8. The device of claim 6 in which said adjustable arm carries an upright extending above and below said ways, arm means attached to the extension above said ways, pattern holding means removably attached to said ways to hold a pattern beneath said arm, pattern follower means on said arm adapted to engage said pattern, and means on said upright beneath said ways to hold said tool, said tool thereby being adapted to be guided by said pattern follower.

* * * * *